US012126228B2

(12) United States Patent
Kuwabara et al.

(10) Patent No.: US 12,126,228 B2
(45) Date of Patent: Oct. 22, 2024

(54) VEHICLE MOTOR WITH SPLITTABLE STATOR AND ROTOR

(71) Applicant: SUBARU CORPORATION, Tokyo (JP)

(72) Inventors: Mitsumasa Kuwabara, Tokyo (JP); Tomohiro Morita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 59 days.

(21) Appl. No.: 17/724,167

(22) Filed: Apr. 19, 2022

(65) Prior Publication Data

US 2022/0368200 A1 Nov. 17, 2022

(30) Foreign Application Priority Data

May 17, 2021 (JP) .................................. 2021-082996

(51) Int. Cl.
*H02K 1/14* (2006.01)
*H02K 1/17* (2006.01)
*H02K 1/22* (2006.01)
*H02K 1/28* (2006.01)
*H02K 15/03* (2006.01)

(52) U.S. Cl.
CPC ............... *H02K 15/03* (2013.01); *H02K 1/17* (2013.01); *H02K 1/22* (2013.01)

(58) Field of Classification Search
CPC ...... H02K 15/03; H02K 2215/00; H02K 1/17; H02K 1/22; H02K 2213/06; H02K 2213/12; H02K 1/18; H02K 1/185; H02K 2201/15; H02K 1/148; H02K 1/06; H02K 1/28; H02K 1/30
USPC ........................... 310/139, 216.008, 216.009
See application file for complete search history.

(56) References Cited

U.S. PATENT DOCUMENTS

| | | | | |
|---|---|---|---|---|
| 2002/0089251 A1* | 7/2002 | Tajima | ................... | H02K 1/276 310/216.106 |
| 2006/0113859 A1* | 6/2006 | Lu | .......................... | H02K 21/22 310/67 R |
| 2012/0074797 A1* | 3/2012 | Petter | ..................... | H02K 21/16 29/598 |
| 2013/0249345 A1* | 9/2013 | Kaiser | .................. | H02K 1/2766 310/216.009 |
| 2016/0233733 A1* | 8/2016 | Biffard | ...................... | H02K 1/30 |
| 2017/0126161 A1* | 5/2017 | Hijikata | ................. | H02K 16/02 |
| 2019/0140511 A1 | 5/2019 | Honda et al. | | |

FOREIGN PATENT DOCUMENTS

JP        2019-088164 A      6/2019

* cited by examiner

*Primary Examiner* — Michael Andrews
(74) *Attorney, Agent, or Firm* — MCGINN I.P. LAW GROUP, PLLC

(57) ABSTRACT

A vehicle motor includes a stator, a rotor, and a shaft. The stator has a ring shape. The rotor is disposed radially inward of the stator. The shaft is disposed radially inward of the rotor and is configured to rotate together with the rotor. The stator is splittable into a plurality of parts, and the rotor is splittable into a plurality of parts.

19 Claims, 6 Drawing Sheets

VEHICLE MOTOR WITH SPLITTABLE STATOR AND ROTOR

CROSS-REFERENCE TO RELATED APPLICATIONS

The present application claims priority from Japanese Patent Application No. 2021-082996 filed on May 17, 2021, the entire contents of which are hereby incorporated by reference.

BACKGROUND

The disclosure relates to the technical field of vehicle motors provided in vehicles.

As described in Japanese Unexamined Patent Application Publication 2019-88164, in a vehicle motor, a wall of a casing has a casing contact area that receives a larger collision load than other areas when a vehicle is involved in a collision, and a contact surface of the casing contact area is in surface contact with the outer peripheral surface of a stator. In this vehicle motor, the stator is responsible for receiving the collision load when the vehicle is involved in the collision, so that breakage of the casing is suppressed.

SUMMARY

An aspect of the disclosure provides a vehicle motor including a stator, a rotor, and a shaft. The stator has a ring shape. The rotor is disposed radially inward of the stator. The shaft is disposed radially inward of the rotor and is configured to rotate together with the rotor. The stator is splittable into a plurality of parts, and the rotor is splittable into a plurality of parts.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A vehicle motor may sometimes be provided in front of a cabin where, for example, the driver boards. In such a case, the vehicle motor is capable of suppressing breakage of a casing, but may possibly break the cabin (i.e., occupant cabin) when an external force is applied thereto as a result of the vehicle being involved in, for example, a collision. Therefore, there is a demand for reducing an external force applied to other components, such as the cabin, as a result of the vehicle being involved in, for example, a collision.

It is desirable to reduce the external force applied to the other components.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Schematic Configuration of Vehicle

Figure 1:
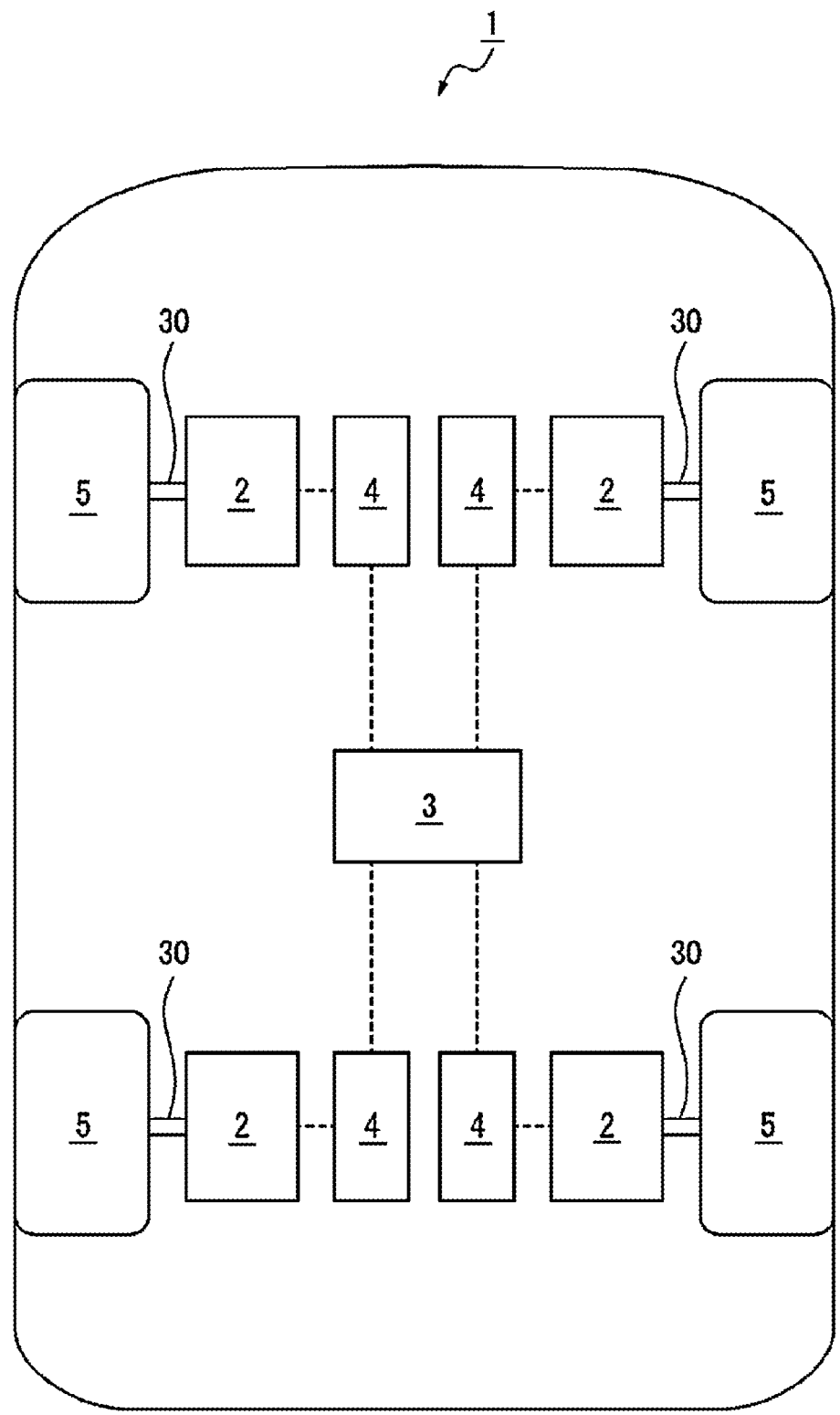
FIG. 1 schematically illustrates the configuration of a vehicle equipped with motors.

FIG. 1 schematically illustrates the configuration of a vehicle 1 equipped with motors 2. Of the components included in the vehicle 1, FIG. 1 mainly extracts components that are relevant to an embodiment of the disclosure and illustrates such relevant components.

As illustrated in FIG. 1, the vehicle 1 includes the motors 2, a controller 3, inverters 4, and wheels 5. The vehicle 1 is an electric automobile equipped with four motors 2 as driving sources.

The motors 2 are, for example, three-phase alternating-current motors. The motors 2 are respectively provided for four wheels 5. Each motor 2 is a so-called on-board motor that is installed in a vehicle body of the vehicle 1 and that is coupled to the corresponding wheel 5 by using a shaft 30.

When the motors 2 are supplied with electric power from a battery (not illustrated) via the inverters 4, the motors 2 generate a driving force (i.e., torque) and transmit the driving force to the wheels 5, thereby causing the vehicle 1 to travel. The vehicle 1 may alternatively be a hybrid automobile equipped with the motors 2 and an engine as driving sources. Furthermore, for example, one motor 2 may be provided for each pair of wheels 5, or the motors 2 may be provided for some of the wheels 5.

The motors 2 also function as generators and generate electricity by performing regenerative driving. The electricity generated by regenerative driving of the motors 2 is supplied to the battery via the inverters 4. Accordingly, the battery is charged.

The inverters 4 operate by being controlled by the controller 3, convert a direct current supplied from the battery into a three-phase alternating current, and supply the three-phase alternating current to the motors 2. Furthermore, when the motors 2 are to perform regenerative driving, the inverters 4 convert an alternating current supplied from the motors 2 into a direct current and supply the direct current to the battery.

The controller 3 is a processor that includes a central processing unit (CPU), a read-only memory (ROM), and a random access memory (RAM). The controller 3 develops a program stored in either one of the ROM and a storage unit (not illustrated) in the RAM and executes the program, thereby controlling the entire vehicle 1.

2. Structure of Motor 2

Figure 2:
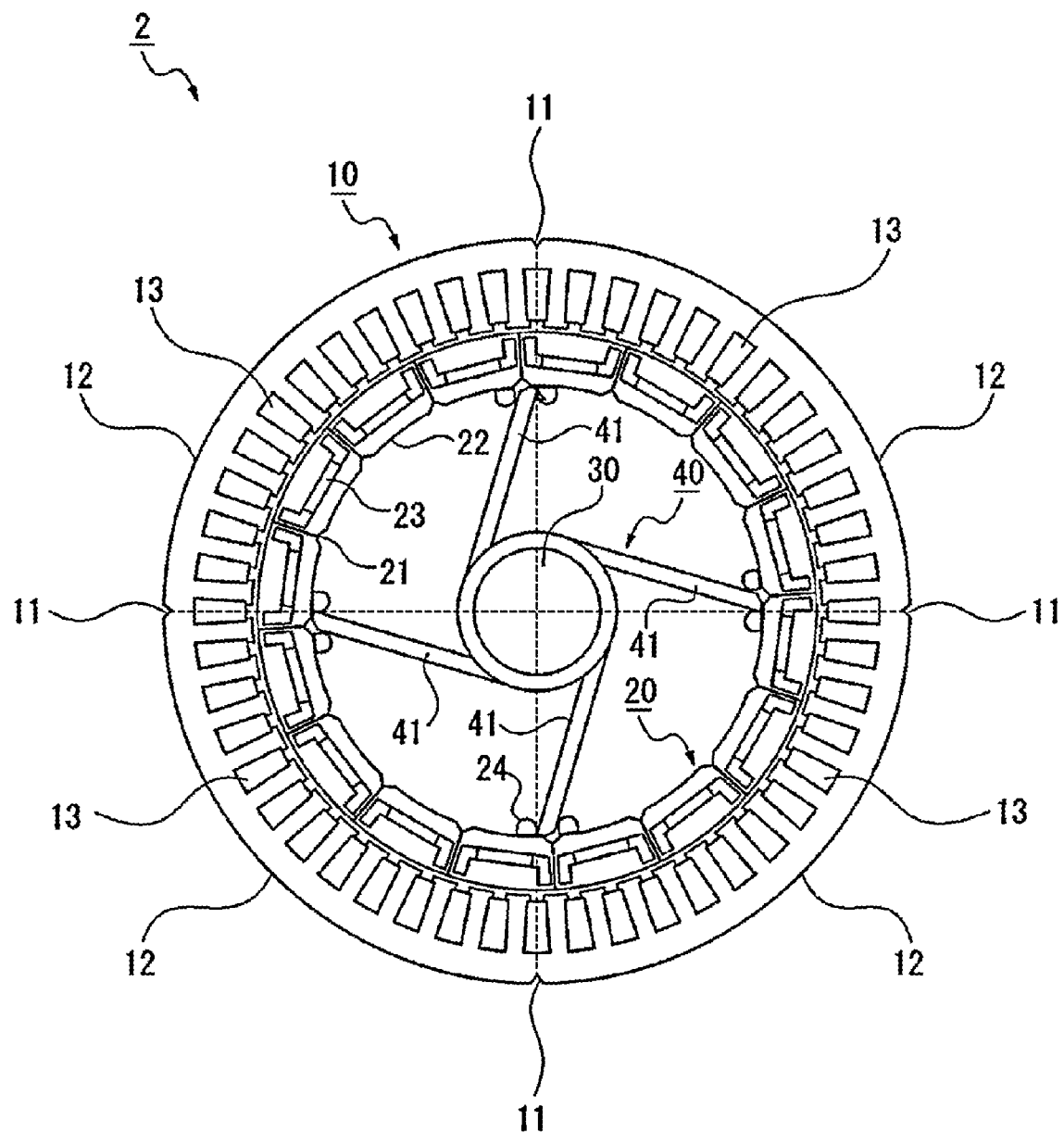
FIG. 2 is a diagram for explaining the structure of each motor.

FIG. 2 is a diagram for explaining the structure of each motor 2. The left-right direction in FIG. 2 corresponds to the front-rear direction of the vehicle 1.

As illustrated in FIG. 2, the motor 2 includes a stator 10, a rotor 20, a shaft 30, and a spoke unit 40. The stator 10, the rotor 20, the shaft 30, and the spoke unit 40 are accommodated within a casing (not illustrated). The stator 10, the rotor 20, and the shaft 30 are disposed on the same axis.

The stator 10 is formed of multiple layers of magnetic steel sheets and is entirely ring-shaped. The stator 10 can be split into a plurality of (i.e., three or more) parts. In the example in FIG. 2, the stator 10 can be split into four parts.

The stator 10 is provided with splitting points 11 at a 90-degree pitch in the circumferential direction. In other words, four splitting points 11 are provided. For example, the splitting points 11 are provided at the front side, the rear side, the upper side, and the lower side of the vehicle 1. At least one splitting point 11 may be provided at either of the front side and the rear side of the vehicle 1.

The splitting points 11 are cutouts formed radially inward from the outer peripheral surface of the stator 10. When an external force (i.e., an impact) is applied, the splitting points 11 serve as origin points from where the stator 10 starts to split.

The splitting points 11 are not limited to this shape and structure and may have any shape and structure so long as the stator 10 can split starting from the splitting points 11 as origin points in response to an external force.

When receiving an external force, the stator 10 splits into, for example, four split cores 12 from the splitting points 11 serving as origin points.

The stator 10 has a plurality of teeth extending radially inward, and each tooth has a coil 13 wound therearound. The coils 13 are supplied with an alternating current from the corresponding inverter 4 (see FIG. 1).

The rotor 20 is provided radially inward of the stator 10 and is entirely ring-shaped. The rotor 20 can be split into a plurality of (i.e., three or more) parts. In the example in FIG. 2, the rotor 20 can be split into 16 parts.

The rotor 20 is provided with splitting points 21 at a 22.5-degree pitch in the circumferential direction. In other words, 16 splitting points 21 are provided. The splitting points 21 are cutouts formed radially outward from the inner peripheral surface of the rotor 20. When an external force (i.e., an impact) is applied, the splitting points 21 serve as origin points from where rotor 20 starts to split.

The splitting points 21 are not limited to this shape and structure and may have any shape and structure so long as the rotor 20 can split starting from the splitting points 21 as origin points in response to an external force.

When receiving an external force, the rotor 20 splits into, for example, 16 split sleeves 22 from the splitting points 21 serving as origin points.

Each split sleeve 22 has a magnet 23 disposed facing the stator 10.

The shaft 30 is disposed radially inward of the rotor 20, extends in the vehicle-width direction (i.e., the left-right direction) of the vehicle 1, and rotates together with the rotor 20. The shaft 30 is coupled to the corresponding wheel 5 (see FIG. 1).

The spoke unit 40 includes, for example, four spokes 41. The rotor 20 and the shaft 30 are coupled to each other by the spokes 41. When the rotor 20 rotates, the spoke unit 40 transmits the rotation to the shaft 30 via the spokes 41. Accordingly, the rotor 20, the shaft 30, and the spoke unit 40 rotate together in the motor 2.

Each spoke 41 is formed of, for example, a plate-like member and has a first end coupled to the shaft 30 and a second end coupled to the rotor 20.

The first end of each spoke 41 is coupled to the shaft 30 by, for example, welding such that the spoke 41 extends in the tangential direction of the shaft 30. Furthermore, the spokes 41 are coupled to the shaft 30 at a 90-degree pitch in the circumferential direction.

The second ends of the spokes 41 are engaged with protrusions 24 provided on the inner peripheral surface of the split sleeves 22.

In the motor 2 having such a configuration, when the coils 13 are supplied with an alternating current, the rotor 20, the shaft 30, and the spoke unit 40 rotate counterclockwise in FIG. 2.

3. Motor 2 Receiving External Force

Figure 3:
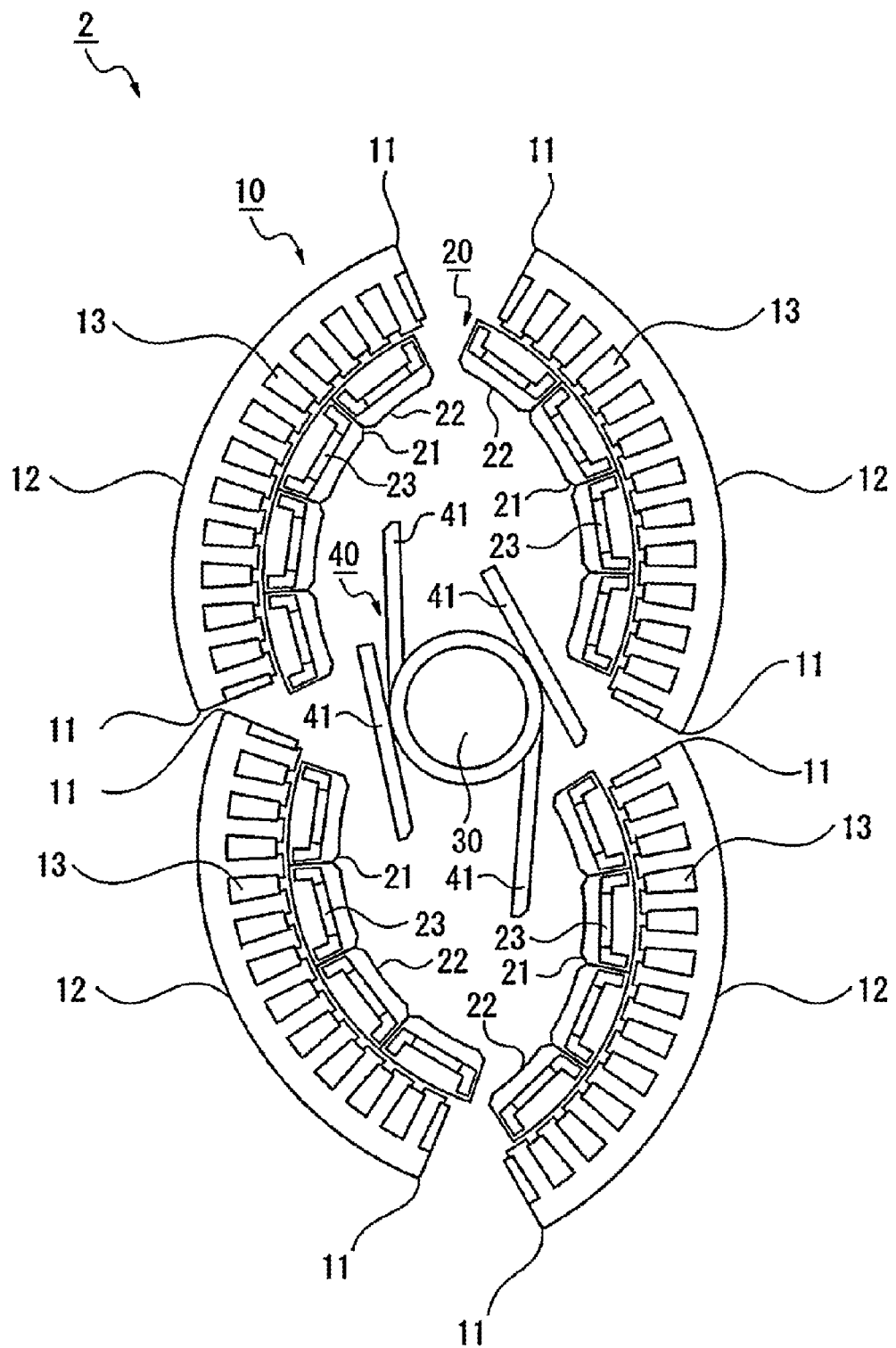
FIG. 3 is a diagram for explaining each motor when receiving an external force.

FIG. 3 is a diagram for explaining each motor 2 when receiving an external force. When the motor 2 receives a force (i.e., an impact) from the front as a result of the vehicle 1 being involved in, for example, a frontal collision, the force is first input to the splitting points 11 of the stator 10. In this case, the force is input particularly to the splitting point 11 provided at the front side. Then, as illustrated in FIG. 3, the stator 10 splits into a plurality of (i.e., four) split cores 12 starting from the splitting points 11 serving as origin points.

When the external force applied to the motor 2 is transmitted to the rotor 20, the force is input to the splitting points 21 of the rotor 20. Then, the rotor 20 splits into a plurality of (i.e., 16) split sleeves 22 starting from the splitting points 21 serving as origin points.

When the external force applied to the motor 2 is transmitted to the spokes 41, the sections (i.e., the first ends) coupled to the shaft 30 break, and the second ends disengage from the protrusions 24.

Accordingly, the stator 10, the rotor 20, and the spoke unit 40 split into the split cores 12, the split sleeves 22, and the spokes 41, respectively, in the motor 2. Therefore, when receiving an external force, the motor 2 consumes energy for splitting the stator 10, the rotor 20, and the spoke unit 40. In other words, the force applied to the vehicle 1 is partially consumed as energy for splitting the motor 2.

Consequently, each motor 2 can absorb an external force caused by a collision and suppress breakage of other components in the vehicle 1.

In particular, in order to drive the front wheels, the motors 2 are sometimes installed forward of a cabin (i.e., an occupant cabin) where, for example, the driver boards. In such a case, the motors 2 can reduce a force to be transmitted to the cabin and further ensure the safety of the driver.

4. During Collision

Next, the deceleration and the amount of deformation of a cabin 60 when the vehicle 1 is involved in a frontal collision will be described with reference to FIG. 4 to FIG. 6 while referring to a motor 70 according to a comparative example as a comparison. The motor 70 according to the comparative example is different from the motor 2 in that the stator, the rotor, and the spoke unit are not splittable.

Figure 4:
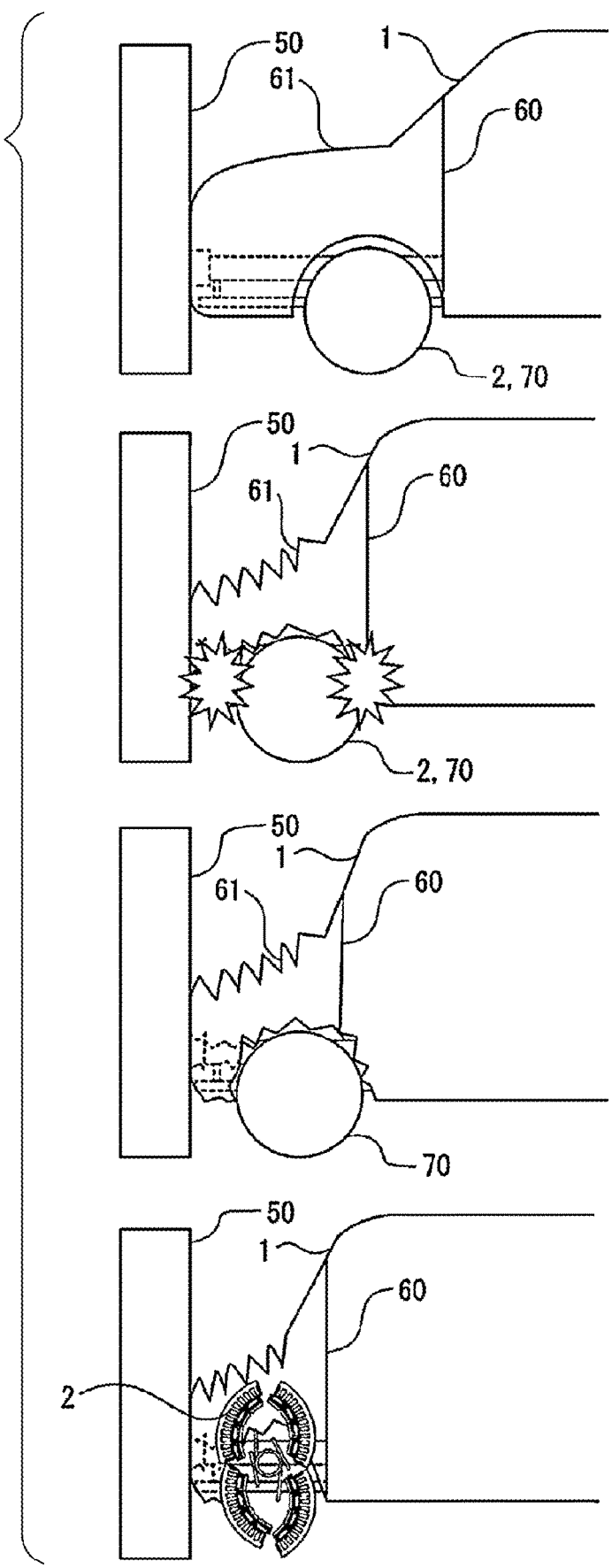
FIG. 4 is a diagram for explaining the deformation of the vehicle during a collision.

FIG. 4 is a diagram for explaining the deformation of the vehicle 1 during the collision.

Figure 5:
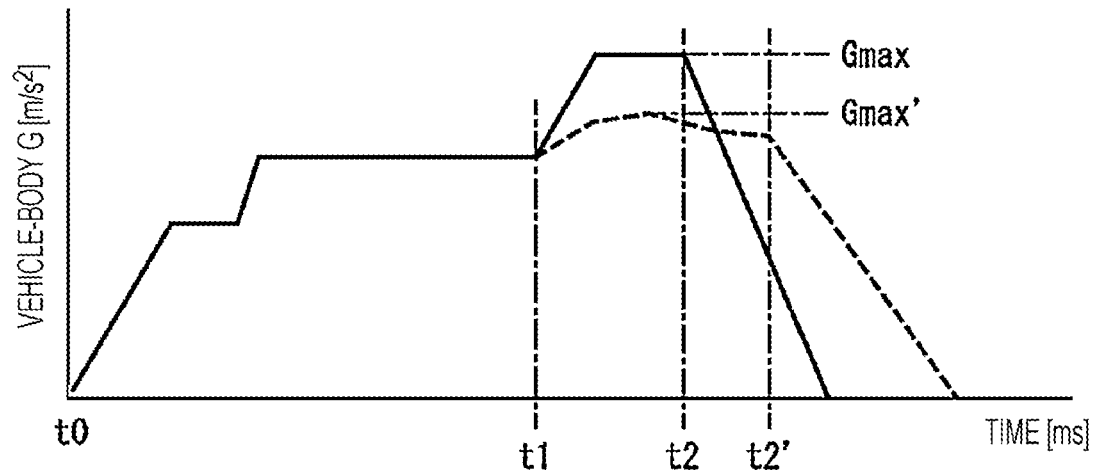
FIG. 5 is a diagram for explaining the deceleration of a cabin during the collision.

FIG. 5 is a diagram for explaining the deceleration of the cabin 60 during the collision. The ordinate axis in FIG. 5 indicates the deceleration (i.e., the vehicle-body G) of the cabin 60 during the collision. The abscissa axis in FIG. 5 indicates time.

Figure 6:
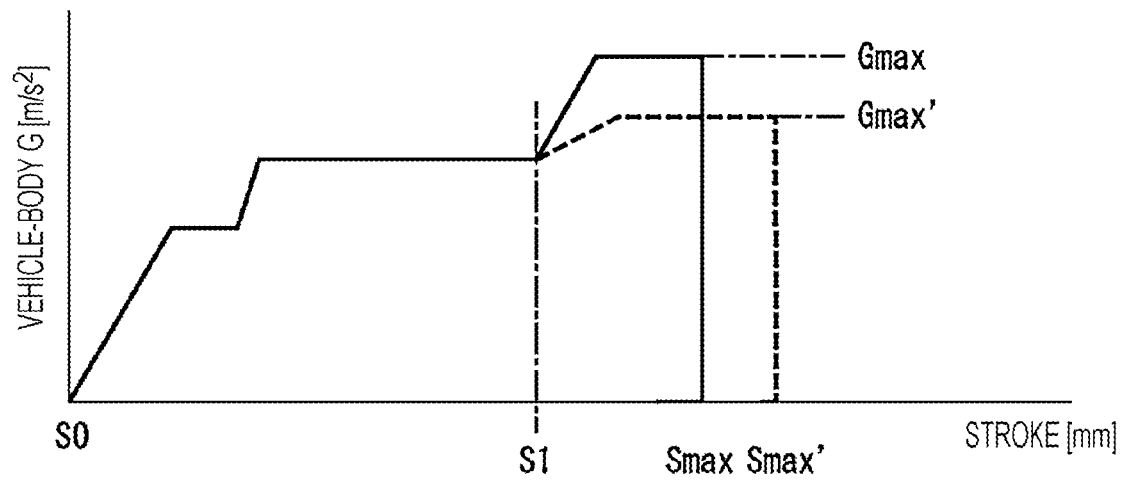
FIG. 6 is a diagram for explaining the amount of deformation of the cabin during the collision.

FIG. 6 is a diagram for explaining the amount of deformation of the cabin 60 during the collision. The ordinate axis in FIG. 6 indicates the deceleration (i.e., vehicle-body G) of the cabin 60 during the collision. The abscissa axis in FIG. 6 indicates the amount of deformation (i.e., the stroke) of the cabin 60.

Furthermore, in FIG. 5 and FIG. 6, the motor 70 according to the comparative example is indicated with a solid line, whereas the motor 2 is indicated with a dashed line.

As illustrated in the uppermost part of FIG. 4, it is assumed that the vehicle 1 is involved in a frontal collision with an obstacle 50. In this case, the time point of the collision is defined as t0, and the amount of deformation is defined as S0.

Then, as illustrated in the second part of FIG. 4, a front compartment 61 of the vehicle 1 becomes crushed as time elapses. While the front compartment 61 is being crushed in this manner, the deceleration of the cabin 60 increases, as illustrated in FIG. 5, and the amount of deformation of the cabin 60 also increases, as illustrated in FIG. 6.

Subsequently, at a time point t1, the motor 2 (or the motor 70) is sandwiched between the obstacle 50 and the cabin 60. The amount of deformation of the cabin 60 at the time point t1 is defined as S1.

As illustrated in the third part of FIG. 4, when the cabin 60 is to further move forward, the motor 70 according to the comparative example is no longer crushed since the components in the motor 70 do not have a splittable structure. Therefore, the deceleration of the cabin 60 increases (i.e., reaches Gmax in FIG. 5 and FIG. 6) when the cabin 60 collides with the motor 70. Subsequently, the deceleration of the cabin 60 decreases while the cabin 60 becomes crushed. Ultimately, the cabin 60 stops at the position where the amount of deformation reaches Smax.

In contrast, as illustrated in the lowermost part of FIG. 4, the motor 2 splits by receiving an external force. Therefore, after the cabin 60 collides with the motor 2, the cabin 60 moves forward while the motor 2 splits (i.e., breaks). Consequently, the deceleration of the cabin 60 is lower (Gmax' in FIG. 5 and FIG. 6) than that of the motor 70 according to the comparative example. The ultimate amount of deformation (Smax') of the cabin 60 is greater than that of the motor 70 according to the comparative example since the motor 2 is split and is crushed in the front-rear direction (i.e., since a space is formed for the movement of the cabin 60).

Accordingly, as compared with the motor 70 according to the comparative example, the motor 2 can reduce the acceleration applied to the cabin 60 and can, by splitting, reduce the amount by which the cabin 60 is crushed. Consequently, the motor 2 can reduce the acceleration applied to, for example, the driver in the cabin 60 and can reduce breakage of the cabin 60.

If the motors 2 that drive the rear wheels receive an external force (i.e., in the case of a rear-end collision), the motors 2 split so that intrusion of the motors 2 toward the cabin 60 can be reduced, thereby expanding the survival space in the rear seat. If the vehicle 1 is a hybrid automobile and has a high-voltage battery installed near the rear wheels, the motors 2 that drive the rear wheels split even when the motors 2 receive an external force, so that the force input to the high-voltage battery can be reduced, thereby achieving enhanced safety.

5. Effects of Embodiment

As described above, the vehicle motor (motor 2) according to the embodiment includes the ring-shaped stator 10, the rotor 20 disposed radially inward of the stator 10, and the shaft 30 that is disposed radially inward of the rotor 20 and that rotates together with the rotor 20. Each of the stator 10 and the rotor 20 is splittable into a plurality of parts.

Accordingly, when the motor 2 receives an external force as a result of the vehicle 1 being involved in, for example, a collision, the stator 10 and the rotor 20 each split into parts.

Therefore, the motor 2 uses energy for splitting the stator 10 and the rotor 20, thereby reducing the external force applied to other components (e.g., the cabin 60).

Furthermore, when receiving the external force, the motor 2 becomes crushed due to the splitting of the stator 10 and the rotor 20, so that the space in which the other components move in response to the impact can be expanded, thereby reducing breakage of the other components.

The stator 10 and the rotor 20 have the splitting points 11 and 21 serving as origin points for splitting.

Accordingly, when the motor 2 receives an external force, the stator 10 and the rotor 20 split starting from the splitting points serving as origin points.

Therefore, when the motor 2 receives an external force, the stator 10 and the rotor 20 can be split readily.

The stator 10 is provided with at least one splitting point 11 at either of the front side and the rear side of the vehicle 1.

Accordingly, an external force generated from the traveling direction of the vehicle 1 when the vehicle 1 is involved in a collision is input to the splitting point 11, so that the stator 10 can be split readily.

The number of splittable parts of the stator 10 is smaller than the number of splittable parts of the rotor 20.

Since the stator 10 is to be used as a magnetic circuit, the magnetic resistance thereof may deteriorate if the number of splittable parts is large. Thus, by decreasing the number of splittable parts of the stator 10, the deterioration in the magnetic resistance can be reduced.

The spokes 41 that couple the shaft 30 and the rotor 20 to each other are provided, and each spoke 41 is disposed in the tangential direction of the shaft 30.

Accordingly, when an external force is applied, each spoke 41 receives a force in the tangential direction of the shaft 30.

Thus, the spokes 41 can be crushed while rotating, so that the spoke unit 40 can be split readily.

Furthermore, by being provided with the spoke unit 40 (i.e., the spokes 41), the motor 2 can have an increased rotor radius. Accordingly, the motor 2 can increase the torque to be generated, and can enhance the energy efficiency.

6. Modifications

Although the embodiment according to the disclosure has been described above, the embodiment according to the disclosure is not limited to the specific example described above and may have various configurations.

Figure 7:
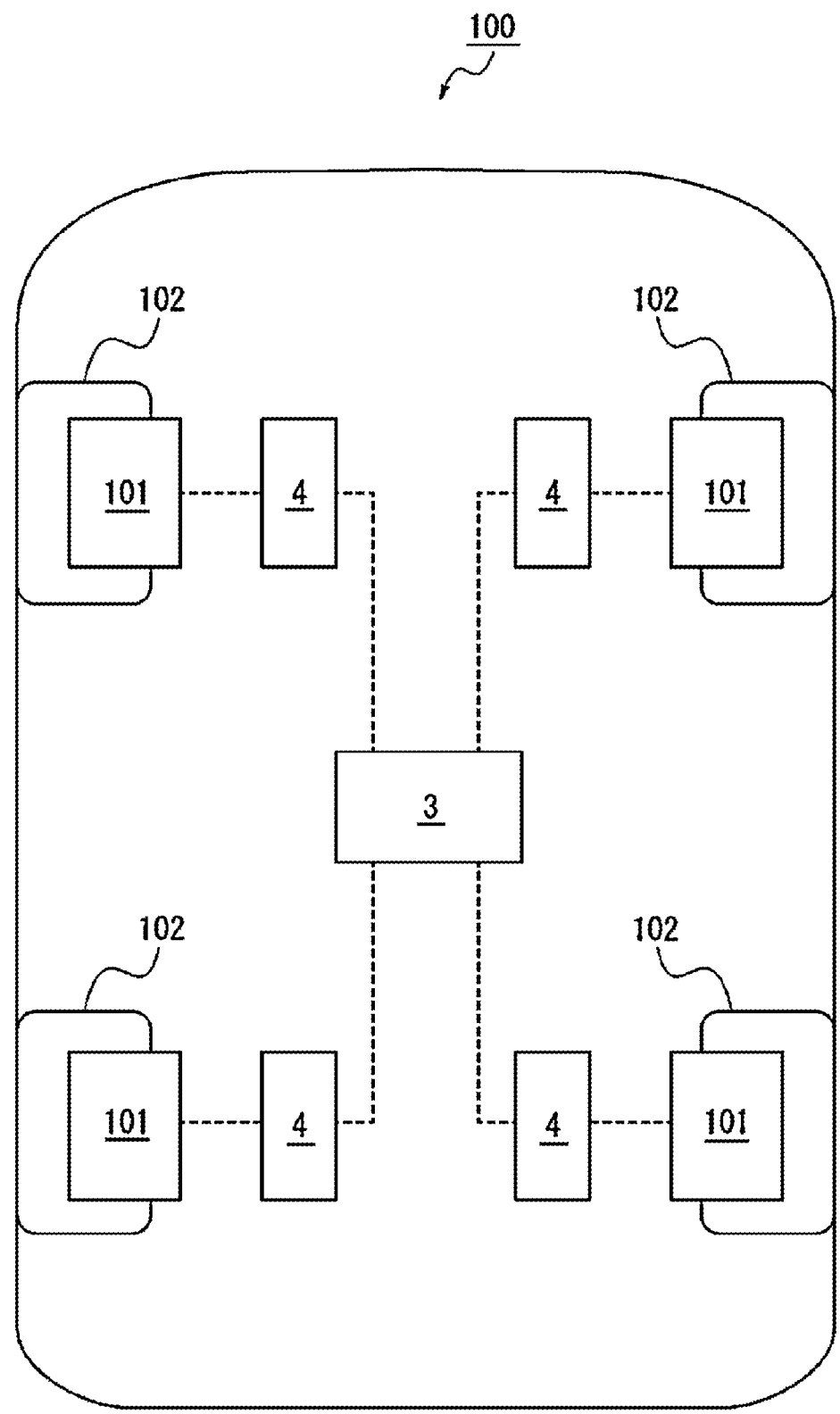
FIG. 7 schematically illustrates the configuration of a vehicle equipped with motors according to a modification.

For example, a vehicle 100 illustrated in FIG. 7 may be provided with motors 101. The motors 101 may be so-called in-wheel motors provided inside corresponding wheels 102. The structure of the motors 101 may be similar to that of the motors 2.

The stator 10 according to the embodiment is provided with the splitting points 11, and splits into the plurality of split cores 12 starting from the splitting points 11 serving as origin points when an external force is applied to the stator 10. Alternatively, the stator 10 may be a combination of a plurality of split cores 12 split in advance, so as to be provided as a single stator 10.

The rotor 20 according to the embodiment is provided with the splitting points 21, and splits into the plurality of split sleeves 22 starting from the splitting points 21 serving as origin points when an external force is applied to the rotor

20. Alternatively, the rotor 20 may be a combination of a plurality of split sleeves 22 split in advance, so as to be provided as a single rotor 20.

The invention claimed is:

1. A vehicle motor comprising:
   a stator;
   a rotor disposed radially inward of the stator;
   a shaft disposed radially inward of the rotor and configured to rotate together with the rotor; and
   at least one spoke configured to couple the shaft and the rotor;
   wherein the stator includes a plurality of first splitting points that are cutouts formed radially inward from an outer peripheral surface of the stator,
   wherein the rotor includes a plurality of second splitting points that are cutouts formed radially outward from an inner peripheral surface of the rotor, and
   wherein the at least one spoke is disposed along a tangential direction of the shaft when viewed from a vehicle-width direction, and only on the rotational side where a vehicle moves forward.

2. The vehicle motor according to claim 1,
   wherein the at least one first splitting point of the stator comprises a splitting point provided at either of a front side and a rear side of a vehicle.

3. The vehicle motor according to claim 2,
   wherein how many parts the stator is splittable into is smaller than how many parts the rotor is splittable into.

4. The vehicle motor according to claim 3, further comprising:
   wherein the at least one spoke has a linear cross-section in a direction in which the shaft extends.

5. The vehicle motor according to claim 2, further comprising:
   wherein the at least one spoke has a linear cross-section in a direction in which the shaft extends.

6. The vehicle motor according to claim 1,
   wherein how many parts the stator is splittable into is smaller than how many parts the rotor is splittable into.

7. The vehicle motor according to claim 6, further comprising:
   wherein the at least one spoke has a linear cross-section in a direction in which the shaft extends.

8. The vehicle motor according to claim 1, further comprising:
   wherein the at least one spoke has a linear cross-section in a direction in which the shaft extends.

9. The vehicle motor according to claim 8, wherein the rotor further comprises a plurality of the second splitting points, and
   wherein the rotor splits into a plurality of split sleeves starting from the plurality of the second splitting points serving as origin points, and
   wherein when the external force is applied to the motor is transmitted to the at least one spoke, a first end of the at least one spoke coupled to a shaft breaks, and a second end of the at least one spoke disengages from a protrusion disposed on an inner peripheral surface of one of the split sleeves.

10. The vehicle motor according to claim 1, wherein the rotor further comprises a plurality of the second splitting points, and
    wherein the rotor splits into a plurality of split sleeves starting from the plurality of the second splitting points serving as origin points.

11. The vehicle motor according to claim 1, wherein the stator further comprises a plurality of the first splitting points, and
    wherein the stator splits into a plurality of parts starting from the plurality of the first splitting points serving as origin points.

12. A vehicle comprising the vehicle motor according to claim 1,
    wherein the vehicle motor is an in-wheel motor.

13. The vehicle motor according to claim 1, further comprising:
    wherein the at least one spoke has a linear straight line cross-section in a direction in which the shaft extends.

14. The motor according to claim 1,
    wherein a number of the at least one spoke is equal to a number of the first splitting points.

15. A motor comprising:
    a stator;
    a rotor disposed radially inward of the stator;
    a shaft disposed radially inward of the rotor and configured to rotate together with the rotor; and
    at least one spoke configured to couple the shaft and the rotor;
    wherein the stator includes a plurality of first splitting points that are cutouts formed radially inward from an outer peripheral surface of the stator,
    wherein the rotor includes a plurality of second splitting points that are cutouts formed radially outward from an inner peripheral surface of the rotor, and
    wherein the at least one spoke is disposed along a tangential direction of the shaft when viewed from a vehicle-width direction, and only on the rotational side where a vehicle moves forward.

16. The motor according to claim 15,
    wherein the at least one first splitting point of the stator comprises a splitting point provided at either of a front side and a rear side of a vehicle.

17. The motor according to claim 15,
    wherein how many parts the stator is splittable into is smaller than how many parts the rotor is splittable into.

18. The motor according to claim 15, further comprising:
    wherein the at least one spoke has a linear cross-section in a direction in which the shaft extends.

19. The motor according to claim 15, wherein the rotor further comprises a plurality of the second splitting points, and
    wherein the rotor splits into the plurality of parts starting from the plurality of the second splitting points serving as origin points,
    wherein the stator further comprises a plurality of the first splitting points, and
    wherein the stator splits into the plurality of parts starting from the plurality of the first splitting points serving as origin points.

* * * * *